United States Patent
Nguyen Tien et al.

(10) Patent No.: US 9,747,201 B2
(45) Date of Patent: Aug. 29, 2017

(54) METHODS AND SYSTEMS FOR MANAGING MEMORY ALLOCATION

(71) Applicant: Facebook, Inc., Menlo Park, CA (US)

(72) Inventors: Dung Nguyen Tien, Newport News, VA (US); Fraidun Akhi, Fremont, CA (US); Jonathan Cook, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 22 days.

(21) Appl. No.: 14/670,026

(22) Filed: Mar. 26, 2015

(65) Prior Publication Data

US 2016/0283366 A1    Sep. 29, 2016

(51) Int. Cl.
*G06F 12/02* (2006.01)
*G06F 12/06* (2006.01)

(52) U.S. Cl.
CPC ...... *G06F 12/0246* (2013.01); *G06F 12/0638* (2013.01); *G06F 2212/205* (2013.01); *G06F 2212/7201* (2013.01); *G06F 2212/7211* (2013.01)

(58) Field of Classification Search
CPC ............ G06F 12/0246; G06F 12/0638; G06F 2212/205; G06F 2212/7201; G06F 2212/7211
See application file for complete search history.

(56) References Cited

U.S. PATENT DOCUMENTS

2014/0208328 A1* 7/2014 Chen ............... G06F 9/5022
718/103
2015/0347261 A1* 12/2015 Li ................ G06F 11/3409
707/602

* cited by examiner

*Primary Examiner* — Yong Choe
(74) *Attorney, Agent, or Firm* — Morgan, Lewis & Bockius LLP

(57) ABSTRACT

An electronic device with volatile memory repeatedly compares an amount of free volatile memory to a first predetermined threshold level of free volatile memory. When the device determines that the amount of free volatile memory is less than the first predetermined threshold level, the device deallocates volatile memory by terminating one or more processes based on predetermined priority levels of the one or more processes.

18 Claims, 8 Drawing Sheets

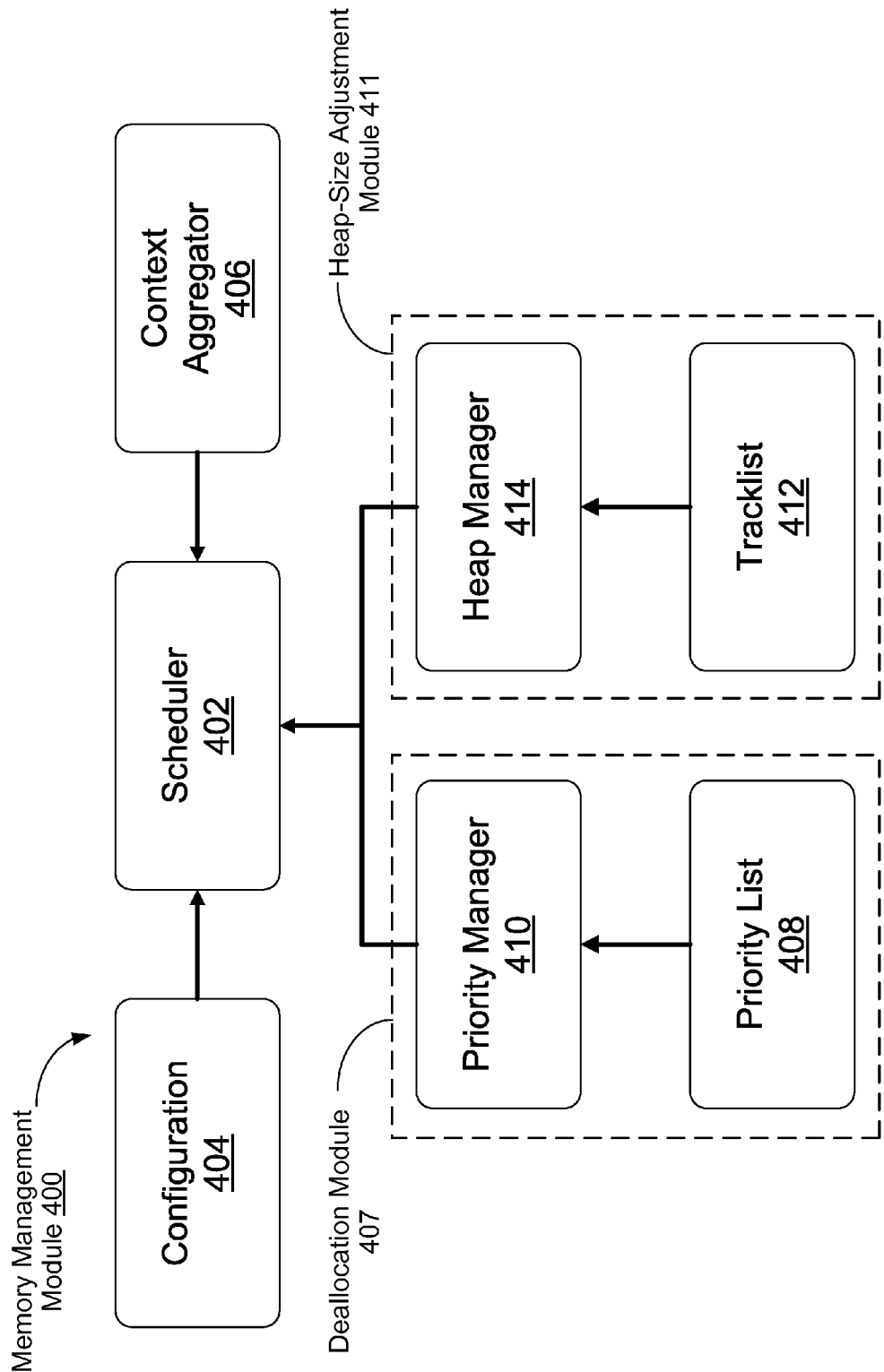

METHODS AND SYSTEMS FOR MANAGING MEMORY ALLOCATION

TECHNICAL FIELD

This relates generally to improving the performance of electronic devices by managing memory allocation (e.g., volatile memory allocation), including but not limited to managing when to deallocate memory, prioritizing processes for memory deallocation, dynamically adjusting memory allocations, and managing global allocation limits.

BACKGROUND

Social networks provide a convenient way for a large number of people to interact with each other. The evolution of social networks has resulted in increased sharing of large multi-media files (e.g., music files, photographs, and videos) and thus in increased memory usage. For example, volatile memory becomes a bottleneck while waiting for writes to non-volatile memory (e.g., flash memory) to be performed when downloading files, since write to non-volatile memory are much slower than writes to volatile memory.

One solution for improving performance is to significantly increase the amount of volatile memory in the mobile device. But this would cause the devices to be prohibitively expensive.

Garbage collection is a form of automatic storage management which allows for portions of memory occupied with objects that are no longer referenced to be reclaimed. In some systems, however, garbage collection alone may not sufficiently or optimally free up memory.

SUMMARY

Accordingly, there is a need for methods and systems with more efficient methods and interfaces for managing memory allocation (e.g., volatile memory allocation). For example, volatile memory could be more efficiently utilized by frequently and efficiently deallocating volatile memory for low-priority processes. Such methods and systems optionally complement or replace conventional methods for managing memory allocation.

Disclosed is a background service for increasing (e.g., maximizing) the amount of available memory to improve the overall performance of a device by invoking selective cleaning of the heap when the available memory of the device falls below a threshold level. An overly aggressive policy, however, will degrade the performance itself. In some embodiments this obstacle is overcome by providing adjustable configurations that allow selection of the best cleaning policy for a particular objective. The adjustable parameters include the aggression level (e.g., the extent of cleaning to be performed when invoked), minimal memory threshold (e.g., the point at which cleaning is invoked), heap size (e.g., dynamic allocation of memory to individual programs), etc. Since some operating systems do not invoke garbage collection until right before issuing the OutOfMemoryError, the present disclosure provides a tool to manage the level of available memory in a more efficient way that avoids such errors and performance degradation.

In accordance with some embodiments, a method is performed at an electronic device with one or more processors, volatile memory, and non-volatile memory. The non-volatile memory stores one or more programs for execution by the one or more processors. The method includes repeatedly comparing an amount of free volatile memory to a first predetermined threshold level. In response to determining that the amount of free volatile memory does not satisfy the first predetermined threshold level, the method further includes deallocating volatile memory. The deallocating includes terminating one or more processes based on priority levels of the processes.

In accordance with some embodiments, an electronic device includes one or more processors, volatile memory, and non-volatile memory. One or more programs are stored in the non-volatile memory and configured to be executed by the one or more processors. The one or more programs include instructions for performing the operations of the method described above. In accordance with some embodiments, a non-transitory computer-readable storage medium has stored therein instructions that, when executed by the electronic device, cause the electronic device to perform the operations of the method described above. In accordance with some embodiments, an electronic device includes one or more processors, volatile memory, non-volatile memory, and means for performing the operations of the method described above.

Thus, electronic devices are provided with more efficient methods for managing memory allocation, thereby increasing the effectiveness, efficiency, and user satisfaction with such devices. Such methods may complement or replace conventional methods for managing memory allocation.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIG. 4 is a block diagram illustrating a memory management module in accordance with some embodiments.

DESCRIPTION OF EMBODIMENTS

Figure 1:
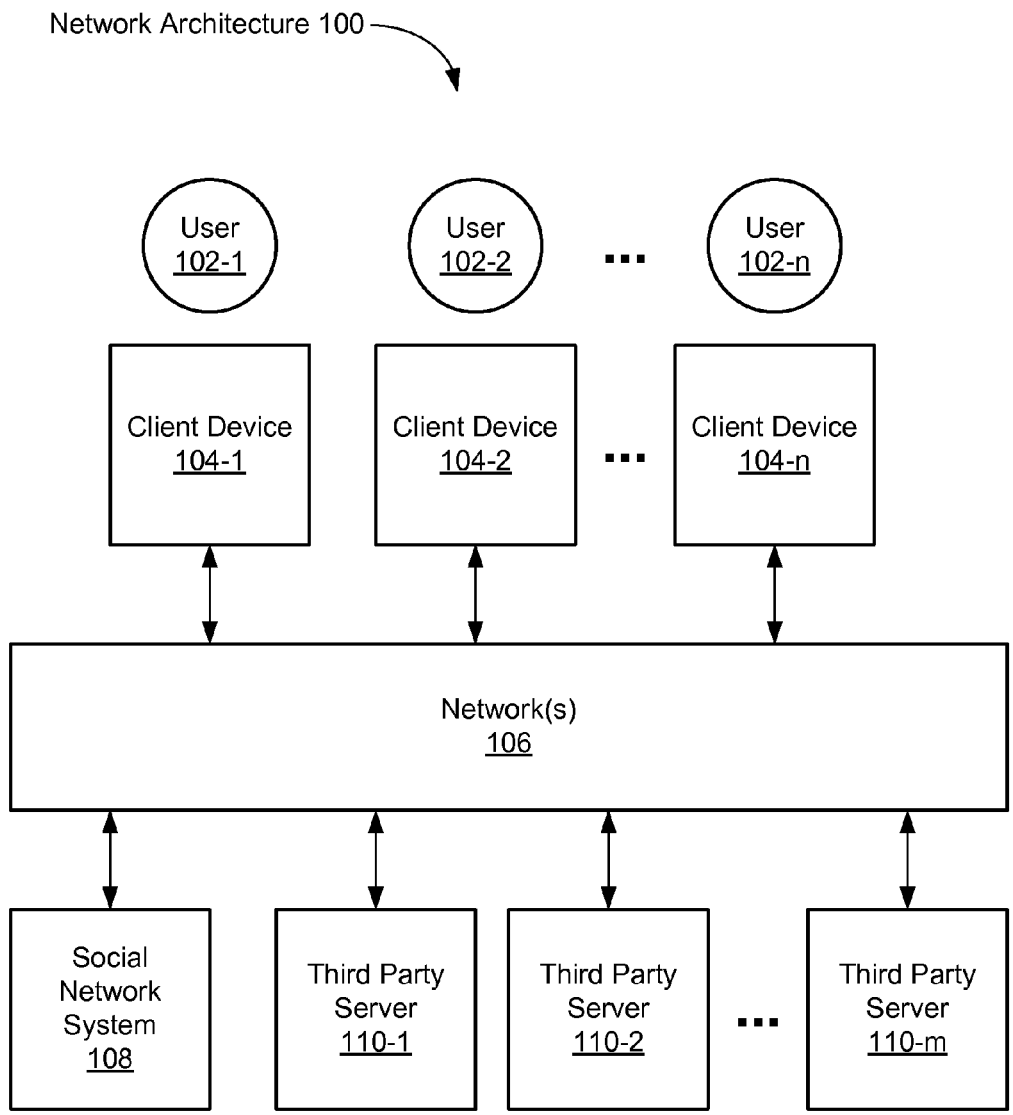
FIG. 1 is a block diagram illustrating an exemplary network architecture of a social network in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first predetermined threshold level could be termed a second predetermined threshold level, and, similarly, a second predetermined threshold level could be termed a first predetermined threshold level, without departing from the scope of the various described embodiments. The first predetermined threshold level and the second predetermined threshold level are both predetermined threshold levels, but they are not the same predetermined threshold level.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

FIG. 1 is a block diagram illustrating an exemplary network architecture 100 of a social network in accordance with some embodiments. The network architecture 100 includes a number of client devices (also called "client systems," "client computers," or "clients") 104-1, 104-2, ... 104-n communicably connected to an electronic social-network system 108 by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1, 104-2, ... 104-n are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the social-network system 108. In some embodiments, the social-network system 108 is a single computing device such as a computer server, while in other embodiments, the social-network system 108 is implemented by multiple computing devices working together to perform the actions of a server system (e.g., cloud computing).

Users 102-1, 102-2, ... 102-n employ the client devices 104-1, 104-2, ... 104-n to access the social-network system 108 and to participate in a corresponding social-networking service provided by the social-network system 108. For example, one or more of the client devices 104-1, 104-2, ... 104-n execute web browser applications that can be used to access the social-networking service. As another example, one or more of the client devices 104-1, 104-2, ... 104-n execute software applications that are specific to the social-networking service (e.g., social-networking "apps" running on smart phones or tablets, such as a Facebook social-networking application running on an iPhone, Android, or Windows smart phone or tablet).

Users interacting with the client devices 104-1, 104-2, ... 104-n can participate in the social-networking service provided by the social-network system 108 by posting information, such as text comments (e.g., updates, announcements, replies), digital photos, videos, audio files, links, and/or other electronic content. Users of the social-networking service can also annotate information posted by other users of the social-networking service (e.g., endorsing or "liking" a posting of another user, or commenting on a posting by another user). In some embodiments, information can be posted on a user's behalf by systems and/or services external to the social-network system 108. For example, the user may post a review of a movie to a movie-review website, and with proper permissions that website may cross-post the review to the social network system 108 on the user's behalf. In another example, a software application executing on a mobile client device, with proper permissions, may use global positioning system (GPS) or other geo-location capabilities (e.g., Wi-Fi or hybrid positioning systems) to determine the user's location and update the social network system 108 with the user's location (e.g., "At Home", "At Work", or "In San Francisco, Calif."), and/or update the social network system 108 with information derived from and/or based on the user's location. Users interacting with the client devices 104-1, 104-2, ... 104-n can also use the social-networking service provided by the social-network system 108 to define groups of users. Users interacting with the client devices 104-1, 104-2, ... 104-n can also use the social-networking service provided by the social-network system 108 to communicate and collaborate with each other.

In some embodiments, the network architecture 100 also includes third-party servers 110-1, 110-2, ... 110-m. In some embodiments, a given third-party server 110 is used to host third-party websites that provide web pages to client devices 104, either directly or in conjunction with the social-network system 108. In some embodiments, the social-network system 108 uses inline frames ("iframes") to nest independent websites within a user's social network session. In some embodiments, a given third-party server is used to host third-party applications that are used by client devices 104, either directly or in conjunction with the social-network system 108. In some embodiments, the social-network system 108 uses iframes to enable third-party developers to create applications that are hosted separately by a third-party server 110, but operate within a social-networking session of a user 102 and are accessed through the user's profile in the social-network system 108. Exemplary third-party applications include applications for books, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given third-party server 110 is used to host enterprise systems, which are used by client devices 104, either directly or in conjunction with the social-network system 108. In some embodiments, a given third-party server 110 is used to provide third-party content (e.g., news articles, reviews, message feeds, etc.).

In some embodiments, a given third-party server 110 is a single computing device, while in other embodiments, a given third-party server 110 is implemented by multiple computing devices working together to perform the actions of a server system (e.g., cloud computing).

Figure 2:
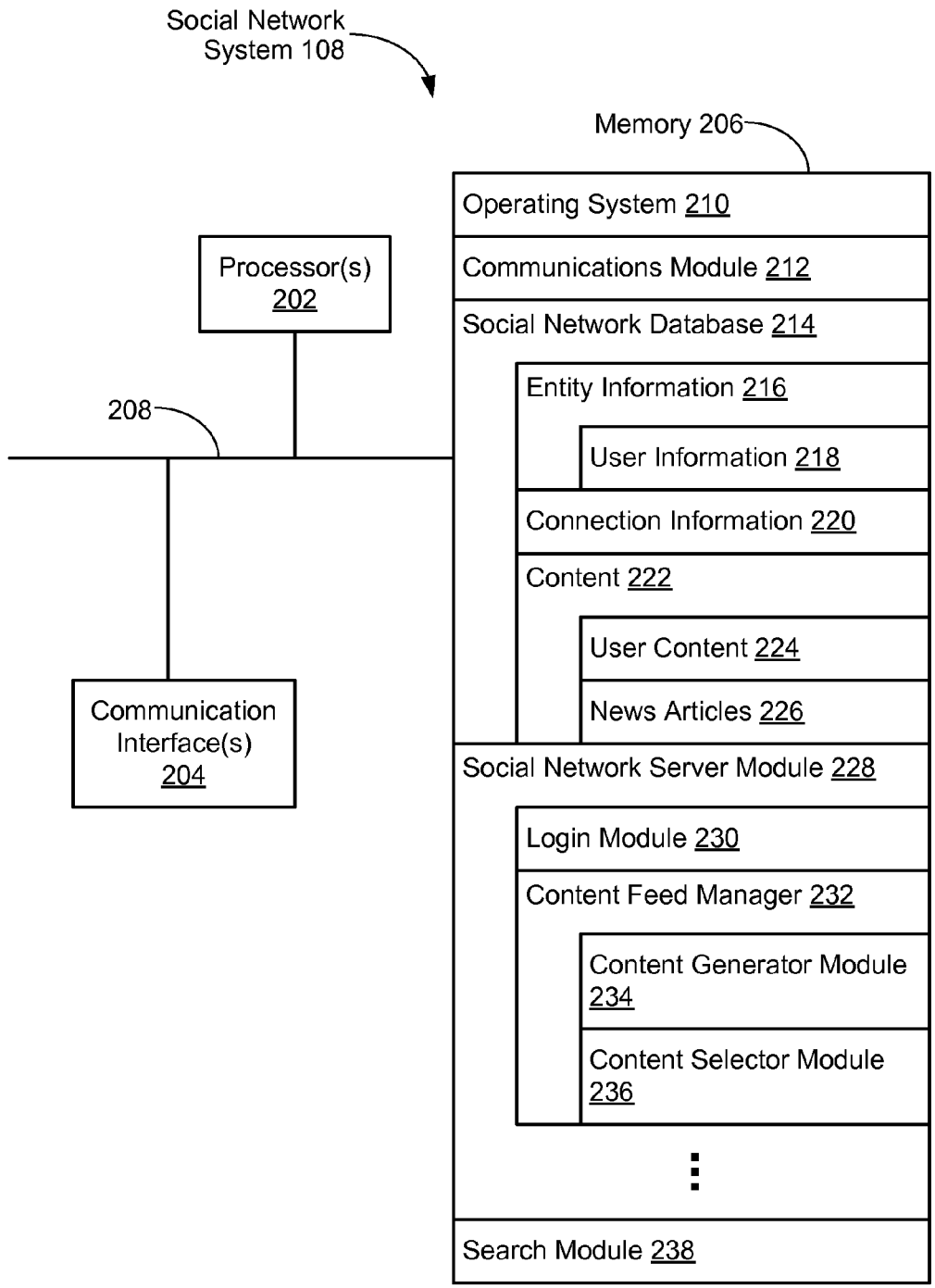
FIG. 2 is a block diagram illustrating an exemplary social-network system in accordance with some embodiments.

FIG. 2 is a block diagram illustrating an exemplary social-network system 108 in accordance with some embodiments. The social-network system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social-network system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:
- an operating system 210 that includes procedures for handling various basic system services and for performing hardware dependent tasks;
- a network communication module 212 that is used for connecting the social-network system 108 to other computers via the one or more communication network interfaces 204 (wired or wireless) and one or more communication networks (e.g., the one or more networks 106)
- a social network database 214 for storing data associated with the social network, such as:
  entity information 216, such as user information 218;
  connection information 220; and
  content 222, such as user content 224 and/or news articles 226;
- a social network server module 228 for providing social-networking services and related features (e.g., in conjunction with browser module 338 or social network client module 340 on the client device 104, FIG. 3), which includes:
  a login module 230 for logging a user 102 at a client 104 into the social-network system 108; and
  a content feed manager 232 for providing content to be sent to clients 104 for display, which includes:
  a content generator module 234 for adding objects to the social network database 214, such as images, videos, audio files, comments, status messages, links, applications, and/or other entity information 216, connection information 220, or content 222; and
  a content selector module 236 for choosing the information/content to be sent to clients 104 for display; and
  a search module 238 for enabling users of the social-network system to search for content and other users in the social network.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social-networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, login information, privacy and other preferences, biographical data, and the like. In some embodiments, for a given user, the user information 218 includes the user's name, profile picture, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social-network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social-network system 108 transmits a "friend request" to the second user. If the second user confirms the "friend request," the social-network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the social-networking service that corresponds to the entity at the other node may include, for example, a selectable "like," "check in," or "add to favorites" icon. After the user clicks one of these icons, the social-network system 108 may create a "like" edge, "check in" edge, or a "favorites" edge in response to the corresponding user action. As another example, the user may listen to a particular song using a particular application (e.g., an online music application). In this case, the social-network system 108 may create a "listened" edge and a "used" edge between the user node that corresponds to the user and the entity nodes that correspond to the song and the application, respectively, to indicate that the user listened to the song and used the application. In addition, the social-network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., games executable within a browser window or frame), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Figure 3:
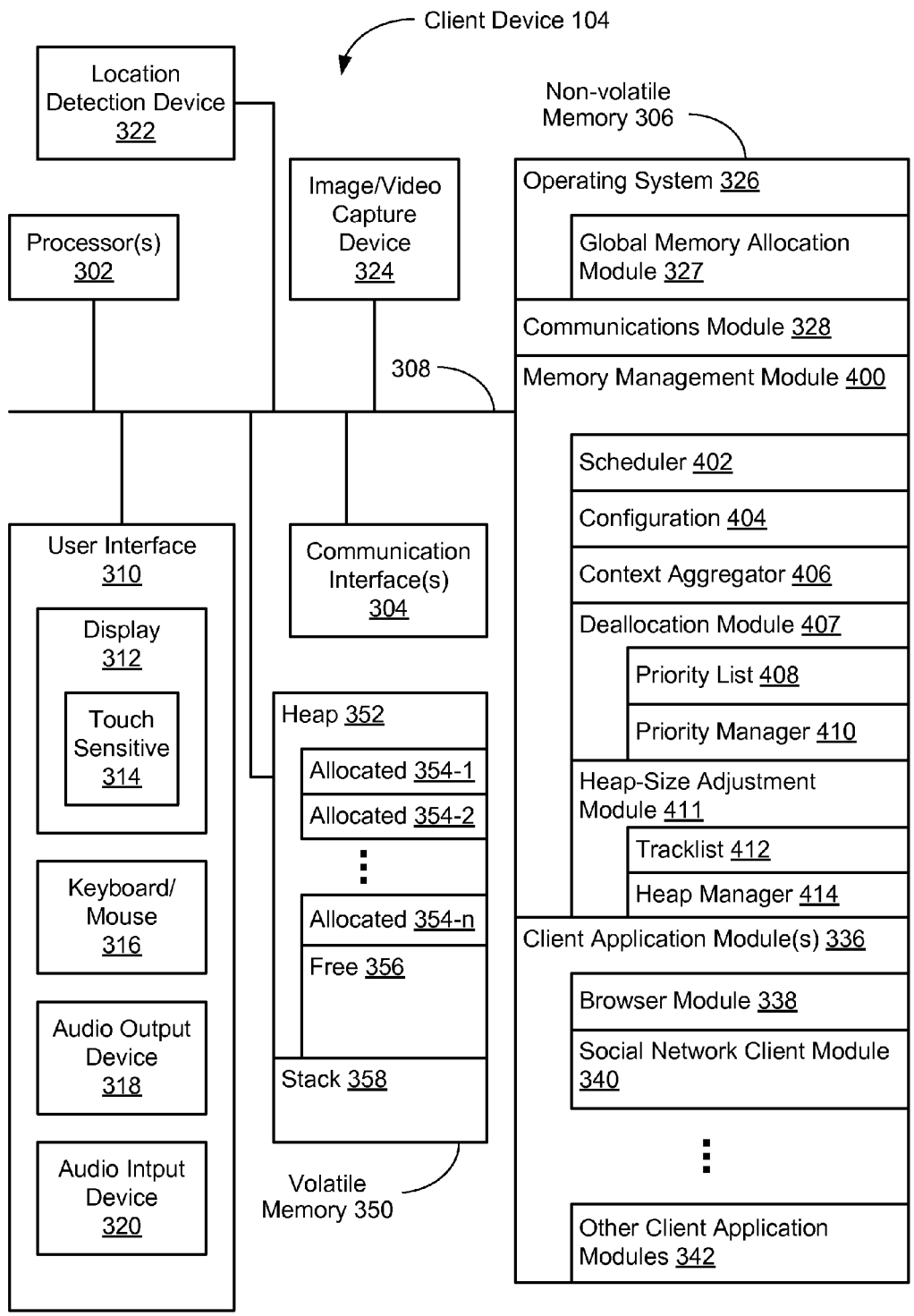
FIG. 3 is a block diagram illustrating an exemplary client device in accordance with some embodiments.

FIG. 3 is a block diagram illustrating an exemplary client device 104 in accordance with some embodiments. The client device 104 typically includes one or more processing units (processors or cores) 302, one or more network or other communications interfaces 304, non-volatile memory 306, volatile memory 350, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam.

Volatile memory 350 includes random-access memory, such as dynamic random-access memory (DRAM). The volatile memory 350 includes a portion (e.g., corresponding to a first range of addresses) that serves as a heap 352 and a portion (e.g., corresponding to a second range of addresses) that serves as a stack 358. Volatile memory 350 in the heap 352 is dynamically allocated to a process upon initiation of the process (e.g., opening of one or more programs stored in non-volatile memory 306). For example, when a certain amount of heap 352 is requested, the client device 104 identifies a block of contiguous addresses of free heap 356 meeting the requested size, according to a global memory allocation module 327. The identified block of heap is then allocated to the requesting process. Allocated portions 354 of the heap 352 (e.g., portion 354-1 allocated to a first process, portion 354-2 allocated to a second process, portion 354-n allocated to an nth process) are then unavailable to fulfill future requests for heap allocation until released (e.g., deallocated) (e.g., upon termination of the processes to which they are allocated). Volatile memory 350 in the stack 358 is allocated upon a call from a process (e.g., one or more programs stored in non-volatile memory 306) in a last in-first out data structure. Allocated stack 358 is released upon completion of a response to the call.

Volatile memory 350 may optionally be replaced with non-volatile memory (e.g., phase-change memory, resistive RAM, or other non-volatile memory technology used as an alternative to DRAM).

Non-volatile memory 306 include, for example, one or more flash memory devices, magnetic disk storage devices, optical disk storage devices, or other non-volatile solid-state storage devices. Non-volatile memory 306 may optionally include one or more storage devices remotely located from the processor(s) 302. Non-volatile memory 306 includes a non-transitory computer-readable storage medium. In some embodiments, non-volatile memory 306 or the computer-readable storage medium of non-volatile memory 306 stores the following programs, modules and data structures, or a subset or superset thereof:

- an operating system 326 that includes procedures for handling various basic system services and for performing hardware dependent tasks, including global memory allocation module 327 for identifying, and allocating, blocks of contiguous free heap 354 that meet process requests, and for setting a global size limit that applies to all heap 352 allocations;
- a network communication module 328 that is used for connecting the client device 104 to other computers via the one or more communication network interfaces 304

(wired or wireless) and one or more communication networks, such as the Internet, cellular telephone networks, mobile data networks, other wide area networks, local area networks, metropolitan area networks, and so on;

a memory management module 400 for managing volatile memory allocations, including the following modules (or sets of instructions), or a subset or superset thereof:

- a scheduler 402 for scheduling memory allocation checks and management of allocations (e.g., reallocations, deallocations, defragmentation, etc.);
- a configuration file 404 including settings for operation of the memory management module (e.g., predetermined threshold levels, periodicity settings, aggression settings, and global heap allocation settings);
- a context aggregator 406 for obtaining run-time context information from the client device 104 (e.g., information about the state of the client device 104);
- a deallocation module 407, including a priority list 408 listing (e.g., ranking) high-priority processes and a priority manager 410 for identifying candidate processes to be terminated (e.g., by deallocating corresponding allocated volatile memory) based on their respective priorities (e.g., as specified by the priority list 408 and/or the operating system 326); and
- optionally, a heap-size adjustment module 411, including a tracklist 412 of processes whose heap usage is monitored, and heap manager 414 for maintaining a global heap size limit available to each process, tracking run-time heap usage of applications on the tracklist 412, allocating additional volatile memory to identified applications, and, optionally, dynamically decreasing the global heap allocation limit of the client device;

one or more client application modules 336, including the following modules (or sets of instructions), or a subset or superset thereof:

- a web browser module 338 (e.g., Internet Explorer by Microsoft, Firefox by Mozilla, Safari by Apple, or Chrome by Google) for accessing, viewing, and interacting with web sites (e.g., a social-networking web site provided by the social-network system 108),
- a social network module 340 for providing an interface to a social-networking service (e.g., a social-networking service provided by social-network system 108) and related features; and/or
- other optional client application modules 342, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards embodiments of the memory management module 400 that may be implemented on a client device (e.g., the client device 104 in FIG. 3).

FIG. 4 illustrates the structure of the memory management module 400 in accordance with some embodiments. The memory management module 400 in this figure is used to illustrate the processes described below, including the processes in FIGS. 5A-5D.

Scheduler 402 repeatedly evaluates run-time memory usage (e.g., volatile memory usage) on an electronic device (e.g., client device 104) and triggers memory clearance (e.g., deallocation of memory in the heap 352) when memory usage of the device falls below a predetermined threshold specified in configuration file 404. Scheduler 402 initiates evaluation based on a schedule specified in configuration file 404 (e.g., according to one or more periodicities). Optionally, scheduler 402 triggers memory clearance by a global memory allocation module 327. However, scheduler 402 dictates to the global memory allocation module 327 certain processes that are not to be terminated, as determined by priority manager 410, dependent upon an aggression level specified in configuration file 404. In some embodiments, scheduler 402 further dictates, to the global memory allocation module 327, one or more relative priorities for termination of respective processes, such that processes are terminated in reverse order of their respective priorities. Termination of a process deallocates memory that was allocated to the process (e.g., in the heap 352).

Configuration file 404 includes settings for the operation of scheduler 402, including the frequency with which scheduler 402 evaluates memory usage of the device, a threshold level for initiating memory cleaning, an aggression level specifying classes of processes eligible for termination, and a global heap size to be allocated upon initiation of a process. Optionally, one or more settings in configuration file 404 are adjustable by the user (e.g., through a settings menu).

Context aggregator 406 compiles run-time volatile memory usage (e.g., records the amount of free memory 356 in heap 352 at specified times) of the client device 104 for evaluation by scheduler 402. Optionally, context aggregator 406 also compiles one or more parameters related to the size of blocks of free volatile memory 356 having contiguous addresses in the heap 352 (e.g., sizes of individual contiguous block of free memory 356). In some embodiments, memory management module 400 further evaluates the fragmentation of free memory 356 in heap 352. In this fashion, scheduler 402 may account for fragmented portions of the heap 352 that are effectively unavailable for further allocation when determining whether the amount of free memory 356 satisfies a predetermined threshold for triggering memory clearance. Optionally, scheduler 402 may trigger defragmentation of the heap 352 when the amount of fragmented free memory 354 exceeds a predetermined threshold specified in configuration file 404.

In some embodiments, context aggregator 406 also provides information about the state of the client device 104 to the scheduler 402. For example, context aggregator 406 determines whether the display 312 is on or off, or whether the client device 104 is in an operating mode or power-saving mode.

Priority list 408 includes a list of high-priority (e.g., top-priority) processes that are ineligible for termination.

Inclusion of an application (e.g., social network client module 340) in this list prioritizes the application over processes not listed in the priority list 408 or listed under a lower priority within the priority list 408. Optionally, priority list 408 also includes one or more lists of lower priority processes that are eligible for termination. Processes having different priorities may be organized in various fashions within priority list 408. In some embodiments, all processes (e.g., applications) listed in priority list 408 are ineligible for termination. In some embodiments, all processes listed in priority list 408 are prioritized over all processes not listed, such that they will not be terminated until all non-listed processes have been terminated. In another embodiments, processes are listed in increasing tiers of priority, e.g., in a top priority tier including all applications deemed ineligible for termination, one or more intermediate tiers of decreasing priority (e.g., in which application become eligible for termination only when all processes having lower priorities have already been terminated), and a bottom priority tier including applications eligible for termination before those in the one or more intermediate priority tiers. Optionally, processes within each priority tier may further be prioritized relative to each other (or processes on the list or prioritized relative to each other without any tiering). Alternatively, all processes within a given priority tier may be equally prioritized. In some embodiments, inclusion of processes in the priority list 408 overrides priorities assigned to the processes in the priority list 408 by the operating system 326.

Optionally, priority list 408 may be customizable by the user (e.g., the user may add or remove processes from the list or may change the priority of an application on the list). Thus, the user may customize the operation of an electronic device 104 to optimize the performance of one or more applications according to their preferences. In some embodiments, the device manufacture or operating system software sets the initial priority list 408 for the device. Alternatively, one or more processes on a priority list 408 (e.g., all processes on the priority list 408) may be specified by the device manufacturer or operating system (e.g., to optimize operation of a particular application on the device) and not changeable by the user.

Priority manager 410 identifies candidate processes running on the electronic device 104 to be terminated based on the priority of the process (e.g., in accordance with priority list 408 and/or priorities assigned by the operating system 326). In some embodiments, scheduler 402 activates priority manager 410 upon determining that the free memory 356 has fallen below a predetermined threshold. Priority manager 410 determines which eligible processes to terminate, based at least in part on their priorities.

In some embodiments, configuration file 404 includes a setting that specifies the aggression level of cleaning (i.e., memory deallocation) to be performed once triggered by scheduler 402. In this fashion, priority manager 410 reads an aggression level setting in configuration file 404 to determine which processes are eligible for termination (e.g., prior to comparing active processes to priority list 408). Examples of aggression levels are described below for operations 514 and 516 (FIG. 5B) of the method 500.

Optionally, memory management module 400 also includes a heap-size adjustment module 411, including a tracklist 412 and heap manager 414.

Figure 5A:
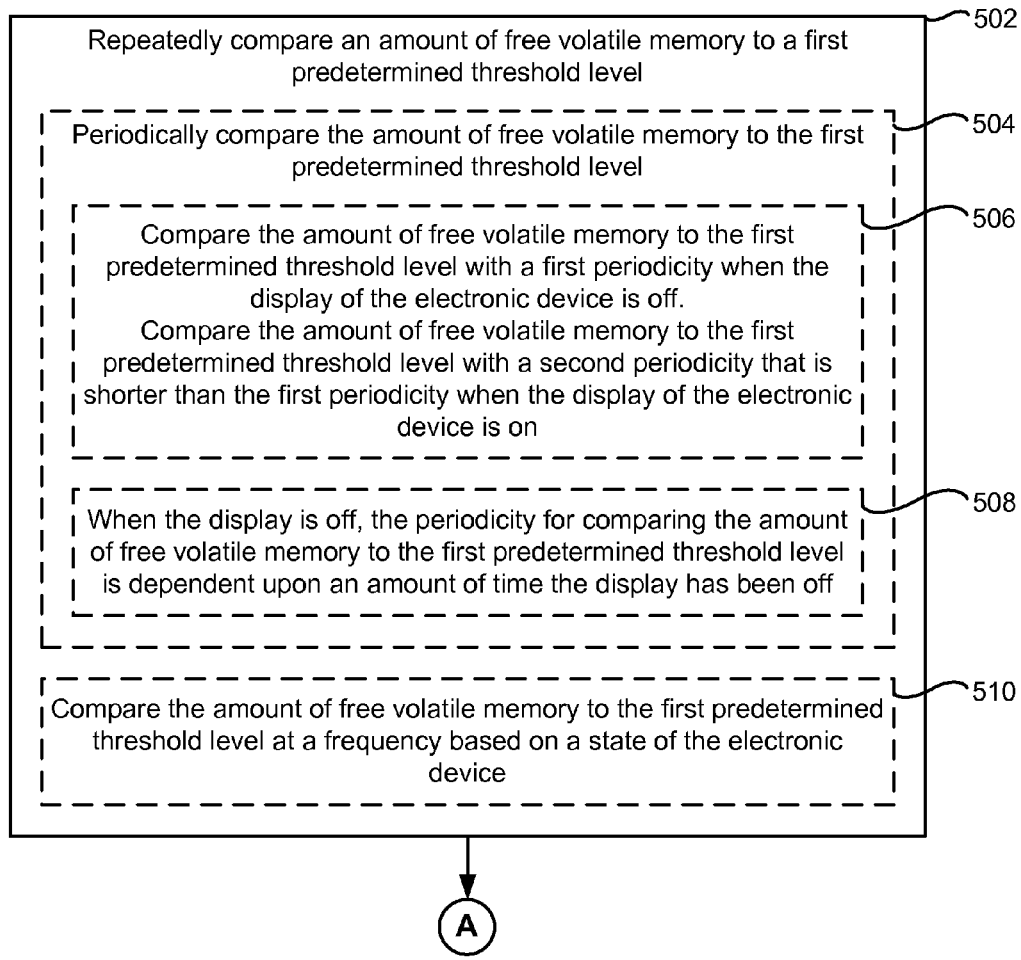
FIGS. 5A-5D are flow diagrams illustrating methods of managing volatile memory allocation on an electronic device in accordance with some embodiments.
Figure 5B:
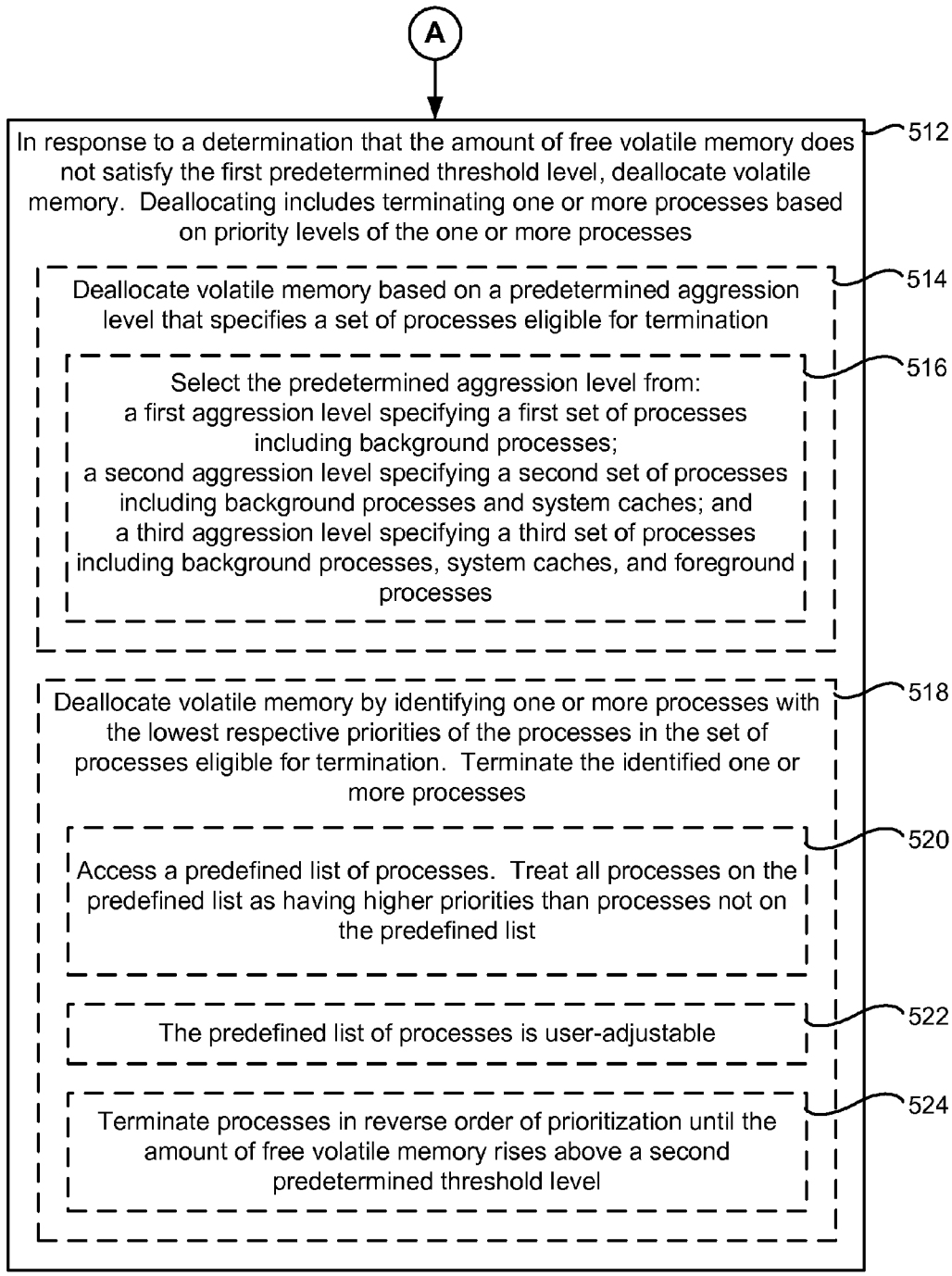
Figure 5C:
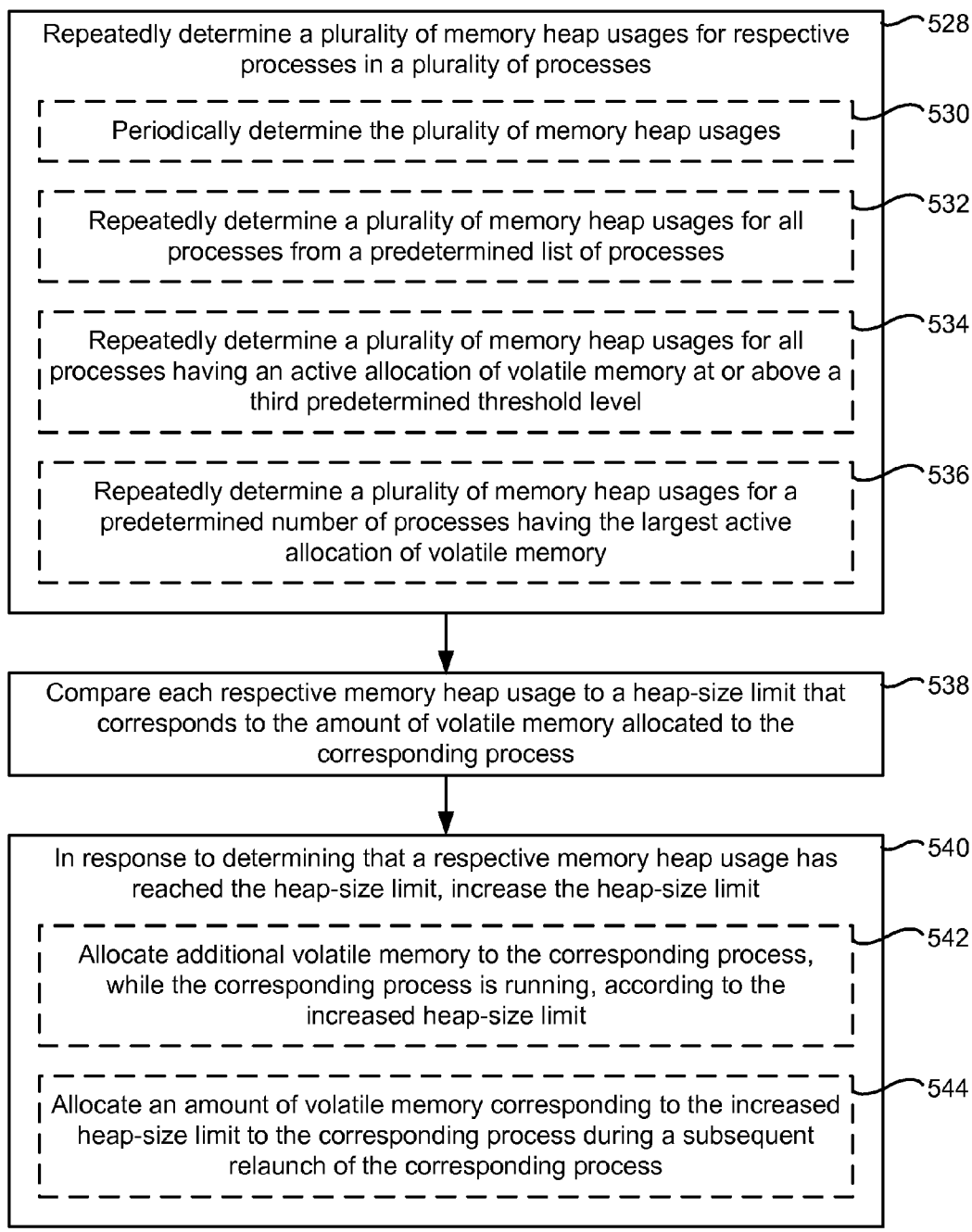
Figure 5D:
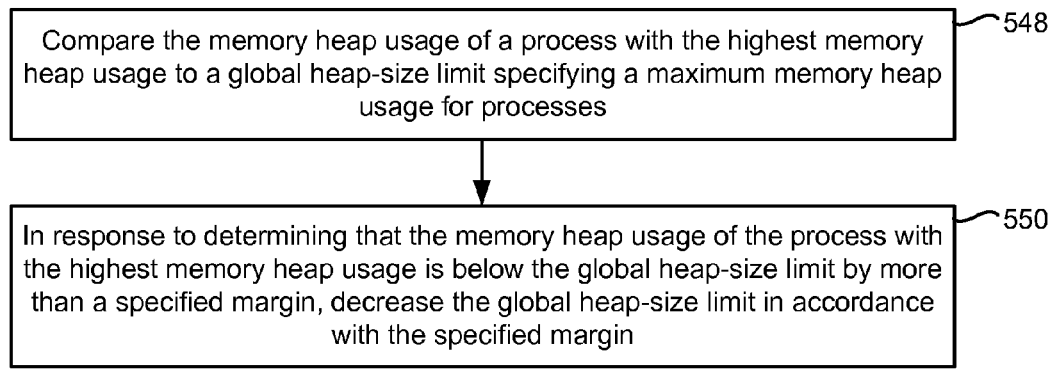

Tracklist 412 includes a list of processes whose heap usage is monitored (e.g., in the methods 526 and/or 546, FIGS. 5C-5D). For example, the programs on the tracklist 412 are high-priority processes and/or processes with large heap allocations.

Heap manager 414 monitors the heap usage of the processes in tracklist 412 (e.g., compares the run-time usage of heap memory to the size of the heap allocation 354). When heap manager 414 determines that the heap usage of a particular process is above a threshold amount of the heap allocated 354 to the process (e.g., the process is actively using >95% or 100% of the heap memory 352 allocated to the process), the heap manager 414 identifies the process for further allocation of heap memory. In some embodiments, the heap manager 414 communicates an identified process to scheduler 402, which coordinates with a global memory allocation module 327 to allocate additional heap during continued operation of the process. In some embodiments, the heap manager 414 specifies that the identified process should be given a larger heap 352 allocation the next time the process launches (e.g., by changing a specified heap-size allocation stored in configuration 402, tracklist 412, or elsewhere in memory 306).

Optionally, when heap manager 414 determines that the heap memory usage of a process with the highest heap memory usage falls below a predetermined threshold of the heap allocated 354 to the process (e.g., the process is using less than a specified percentage of the heap allocated to the process or of a global heap allocation limit), the heap manager reduces a global heap allocation limit (e.g., by changing the global heap allocation limit stored in configuration 402, tracklist 412, or elsewhere in memory 306).

FIGS. 5A-5B are flow diagrams illustrating a method 500 of managing volatile memory allocation on an electronic device (e.g., a client device 104 such as a smart watch, a smart phone, a tablet, a laptop, or a desktop computer) in accordance with some embodiments. Method 500 is performed on the electronic device, which includes a user interface, (e.g., touch-sensitive display 314) one or more processors (e.g., processor(s) 302), non-volatile memory (e.g., memory 306) and volatile memory (e.g., volatile memory 350). FIGS. 5A-5B correspond to instructions stored in a computer memory or computer-readable non-volatile storage medium (e.g., memory 306). While the method 500 is described for volatile memory allocation, a similar method may be performed for non-volatile memory allocation in accordance with some embodiments.

As described below, method 500 improves the operation of an electronic device by freeing memory through efficient process termination. Method 500 also improves the operation of high priority applications on the electronic device by prioritizing them over lower priority applications when deallocating volatile memory.

The electronic device repeatedly compares (502) an amount of free volatile memory (e.g., the amount of unallocated heap 356) to a first predetermined threshold level (e.g., a factory setting, user setting, or combination therein). For example, memory management module 400 (e.g., via scheduler 402) compares the amount of unallocated heap 356 at a given point in time to a predetermined percentage of the total heap 352 of volatile memory 350 (e.g., as specified in configuration file 404). In some embodiments, the electronic device periodically compares (504) the amount of free volatile memory to the first predetermined threshold level (e.g., according to a first periodicity specified in configuration file 404, such as every 20 seconds, every minute, etc.).

In some embodiments, the device monitors the volatile memory usage more frequently when the device is being used by a user (e.g., as determined by whether the display is on) than when the device is not being used by a user (e.g., as determined by whether the display is off). For example, the device compares (506) the amount of free volatile memory to the first predetermined threshold level with a first periodicity (e.g., as specified in configuration 504) when the display of the device is off. The device compares the amount of free volatile memory to the first predetermined threshold level with a second periodicity that is shorter than the first periodicity when the display of the device is on (i.e., the comparison is performed more frequently when the display is on than off). While any two respective periodicities are contemplated, exemplary first and second periodicities are on the order of seconds, tens of seconds, or minutes (e.g., every 60 second when the device is not being used by a user and every 20 seconds when the display is being used by a user).

In some embodiments, when the display is off, the periodicity for comparing the amount of free volatile memory to the first predetermined threshold level is dependent upon an amount of time the display has been off (508). For example, the longer since the device was last used for the device, the longer the periodicity at which the device monitors volatile memory usage. For example, the device monitors volatile memory usage with a first periodicity (e.g., every 60 seconds) for a first length of time during which the device has not been in use and with a second, longer periodicity once the first length of time has passed and the device still has not been used by a user.

In some embodiments, the device compares (510) the amount of free volatile memory to the first predetermined threshold level at a frequency based on a state of the electronic device. For example, the frequency is based on whether the display of the device is on or off, whether the device is connected to the internet, whether the device is in airplane mode, and/or the amount of free volatile memory available upon a previous comparison (e.g., if memory in the heap is mostly unallocated, the device will check the status less frequently than when a higher percentage of the memory in the heap is allocated).

In response to a determination that the amount of free volatile memory does not satisfy the first predetermined threshold level, the electronic device deallocates (512, FIG. 5B) volatile memory (e.g., a portion of allocated volatile heap memory 354 is released as free volatile heap memory 356, allowing for further allocations of volatile heap memory as needed). Deallocating memory includes terminating one or more processes based at least in part on priority levels of the one or more processes. In some embodiments, priorities are assigned by the operating system 326, but the priority list 408 overwrites this assignment for listed processes (e.g., such that any process on the priority list 408 has a higher priority than any process not on the priority list 408).

In some embodiments, the device deallocates (514) volatile memory based on a predetermined aggression level (e.g., as specified in configuration file 404) that specifies a set of processes eligible for termination. In some embodiments, the predetermined aggression level is selected (516) from: a first aggression level specifying a first set of processes including background processes; a second aggression level specifying a second set of processes including background processes and system caches; and a third aggression level specifying a third set of processes including background processes, system caches, and foreground processes. In some embodiments, the device terminates processes based on predetermined priorities of applications falling with a predetermined aggression level.

In some embodiments, the device deallocates (518) volatile memory by identifying (e.g., via priority manager 410) one or more processes with the lowest respective priorities of the processes in the set of processes eligible for termination (e.g., all processes corresponding to a given aggression level specified in configuration file 404), and terminating the identified one or more processes.

In some embodiments, the device accesses (520) a predefined list of processes (e.g., priority list 408), and treats all processes on the predefined list as having higher priorities than processes not on the predefined list (e.g., by overwriting assignments made by the operating system 326).

In some embodiments, the predefined list of processes (e.g., priority list 408) is user-adjustable (522). For example, the user may prioritize or de-prioritize particular applications to improve their performance on the device (e.g., to improve the performance of a social networking application). In some embodiments, the device manufacturer may permanently list one or more applications (e.g., operating system processes and/or preferred applications) in the predefined list, such that the user cannot remove the one or more applications from the predefined list. In some embodiments, the device manufacturer may set the priority of one or more applications (e.g., operating system processes and/or preferred applications), such that the user cannot override these settings.

In some embodiments, the device terminates (524) processes in reverse order of prioritization (i.e., from lowest priority toward highest priority) until the amount of free volatile memory (e.g., free heap volatile memory 356) rises above a second predetermined threshold level (e.g., above a preferred percentage of the total heap volatile memory 352, as specified in configuration file 404).

FIG. 5C is a flow diagram illustrating a method 526 of managing volatile memory allocation on an electronic device (e.g., client device 104) in accordance with some embodiments. Method 526 can be performed in conjunction with method 500, illustrated in FIGS. 5A-5B, and/or method 546, illustrated in FIG. 5D. Method 526 is performed on the electronic device (e.g., client device 104), which includes a user interface, (e.g., touch-sensitive display 314) one or more processors (e.g., processor(s) 302), non-volatile memory (e.g., memory 306) and volatile memory (e.g., volatile memory 350). FIG. 5C corresponds to instructions stored in a computer memory or computer-readable non-volatile storage medium (e.g., memory 306).

As described below, method 526 improves the operation of an electronic device by dynamically allocating additional volatile memory to applications whose memory needs exceed the allocated volatile memory.

The electronic device repeatedly determines (528) a plurality of memory heap usages for respective processes (e.g., processes specified in tracklist 412) in a plurality of processes (e.g., processes specified in tracklist 412). For example, memory management module 400 (e.g., via scheduler 402) determines the amount of allocated volatile heap memory 354 actually being used by processes (e.g., applications stored in memory 306 and running on the processor(s) 302) at a given point in time. In some embodiments, the device periodically determines (530) the plurality of memory usages (e.g., according to a third periodicity specified in configuration file 404, such as every 20 seconds, every minute, etc.). In some embodiments, the periodicity at which the device determines the plurality of memory heap usages is the same periodicity at which the device compares the amount of free volatile memory to a first threshold level (e.g., in operation 504, 506, 508, or 510, FIG. 5A). In some embodiments the periodicities are different.

In some embodiments, the device monitors the plurality of memory heap usages more frequently when the device is being used by a user (e.g., as determined by whether the display is on) than when the device is not being used by a user (e.g., as determined by whether the display is off). For example, the device determines the plurality of memory heap usages with a third periodicity (e.g., as specified in configuration 404) when the display of the device is off. The device determines the plurality of memory heap usages with a fourth periodicity (e.g., as specified in configuration 404) that is shorter than the third periodicity when the display of the device is on (i.e., memory heap usage is determined more frequently when the display is on than off). While any two respective periodicities are contemplated, exemplary third and fourth periodicities are on the order of seconds, tens of seconds, or minutes (e.g., every 60 second when the device is not being used by a user and every 20 seconds when the display is being used by a user).

In some embodiments, when the display is off, the periodicity for determining the plurality of memory heap usages is dependent upon an amount of time the display has been off (e.g., by analogy to operation 508, FIG. 5A). For example, the longer since the device was last used for the device, the longer the periodicity at which the device determines the plurality of memory heap usages.

In some embodiments, the device determines the plurality of memory heap usages at a frequency based on a state of the electronic device (e.g., by analogy to operation 510, FIG. 5A).

In some embodiments, the device repeatedly determines (532) a plurality of memory heap usages for all processes from a predetermined list of processes (e.g., tracklist 412). The processes being monitored thus are selected based on their inclusion in the predetermined list.

In some embodiments, the device repeatedly determines (534) a plurality of memory heap usages for all processes having an active allocation of volatile memory at or above a third predetermined threshold level. For example, the processes being monitored are selected because they have large allocations of volatile heap memory 352, and therefore affect the availability of memory in the heap more than processes with smaller allocations.

In some embodiments, the device repeatedly determines (536) a plurality of memory heap usages for a predetermined number of processes having the largest active allocation of volatile memory. In some embodiments, the processes being monitored are selected based on either or both their inclusion in a predetermined list and/or their large allocations of volatile heap memory 352.

The electronic device then compares (538) each respective memory heap usage to a heap-size limit that corresponds to the amount of volatile memory (e.g., allocated volatile heap memory 354) allocated to the corresponding process (e.g., the device determines how much of the allocated heap the process is actually using, via heap manager 414).

In response to determining that a respective memory heap usage has reached the heap-size limit (e.g., the process is using all of the allocated volatile heap memory 354), the device increases (540) the heap-size limit (or the amount of memory that can be allocated to the process). In some embodiments, increasing the heap-size limit includes allocating (542) additional volatile memory (e.g., the device allocates an additional 10% free heap 548), to the corresponding process, while the corresponding process is running, according to the increased heap-size limit. In some embodiments, increasing the heap-size limit includes allocating (544) an amount of volatile memory corresponding to the increased heap-size limit to the corresponding process during a subsequent re-launch of the corresponding process (e.g., by changing a heap allocation setting stored in configuration file 404, tracklist 412, or elsewhere in memory 306.). In some embodiments, increasing the heap-size limit includes performing both operations 542 and 544.

FIG. 5D is a flow diagram illustrating a method 546 of managing volatile memory allocation on an electronic device (e.g., client device 104) in accordance with some embodiments. Method 546 can be performed in conjunction with method 500, illustrated in FIGS. 5A-5B, and/or method 526, illustrated in FIG. 5C. Method 500 is performed on the electronic device, which includes a user interface, (e.g., touch-sensitive display 314) one or more processors (e.g., processor(s) 302), non-volatile memory (e.g., memory 306) and volatile memory (e.g., volatile memory 350). FIG. 5D corresponds to instructions stored in a computer memory or computer-readable non-volatile storage medium (e.g., memory 306).

As described below, method 566 improves the operation of an electronic device by dynamically reducing the global heap allocation limit when processes having the highest heap usage are using less memory than allowed by the global heap allocation limit. In this fashion, the device reduces the allocation of volatile memory that will likely not be used (e.g., as determined by the user's history of using the application), freeing it up for allocation to additional processes.

The electronic device compares (548) the memory heap usage of a process with the highest memory heap usage (e.g., from the process actively using the most heap) to a global heap-size limit specifying a maximum memory heap usage for processes (e.g., as specified in the configuration file 404, tracklist 412, global memory allocation module 327, or elsewhere in memory 306). In some embodiments, this comparison is performed with a periodicity as described for methods 500 and 526, above.

In response to determining that the memory heap usage of the process with the highest memory heap usage is below the global heap-size limit by more than a specified margin (e.g., a specified percentage, such as 10%, 15%, or 20%), the global heap-size limit is decreased (550) in accordance with the specified margin (e.g., until the difference between the memory heap usage of the process with the highest memory heap usage and the global heap-size limit is equal to the specified margin). In some embodiments, the device uses only the most recent determination of memory heap usage when decreasing the global heap-size limit. In other embodiments, the device uses the highest determined memory heap usage over a specified period of time when decreasing the global heap-size limit.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
    at an electronic device having a display, one or more processors, volatile memory, and non-volatile memory, the non-volatile memory storing one or more programs for execution by the one or more processors:
        repeatedly comparing an amount of free volatile memory to a first predetermined threshold level; and
        in response to a determination that the amount of free volatile memory does not satisfy the first predetermined threshold level, deallocating volatile memory, the deallocating comprising:
            identifying one or more processes having the lowest respective priorities of the processes in a set of processes eligible to be terminated; and
            terminating the identified one or more processes in reverse order of prioritization until the amount of free volatile memory rises above a second predetermined threshold level.

2. The method of claim 1, wherein repeatedly comparing the amount of free volatile memory to the first predetermined threshold level comprises periodically comparing the amount of free volatile memory to the first predetermined threshold level.

3. The method of claim 2, wherein periodically comparing the amount of free volatile memory to the first predetermined threshold level comprises:
    comparing the amount of free volatile memory to the first predetermined threshold level with a first periodicity when the display of the electronic device is off; and
    comparing the amount of free volatile memory to the first predetermined threshold level with a second periodicity that is shorter than the first periodicity when the display of the electronic device is on.

4. The method of claim 2, wherein, when the display is off, the periodicity for comparing the amount of free volatile memory to the first predetermined threshold level is dependent upon an amount of time the display has been off.

5. The method of claim 1, wherein a frequency for repeatedly comparing the amount of free volatile memory to the first predetermined threshold level is based on a state of the electronic device.

6. The method of claim 1, wherein a predetermined aggression level specifies the set of processes eligible for termination.

7. The method of claim 6, wherein the predetermined aggression level is selected from a group of available aggression levels consisting of:
    a first aggression level that specifies a first set of processes including background processes;
    a second aggression level that specifies a second set of processes including background processes and system caches; and
    a third aggression level that specifies a third set of processes including background processes, system caches, and foreground processes.

8. The method of claim 1, wherein the identifying comprises:
    accessing a predefined list of processes; and
    treating all processes on the predefined list as having higher priorities than processes not on the predefined list.

9. The method of claim 8, wherein the predefined list of processes is user-adjustable.

10. The method of claim 1, further comprising:
    repeatedly determining a plurality of memory heap usages for respective processes in a plurality of processes;
    comparing each respective memory heap usage in the plurality of memory heap usages to a heap-size limit that corresponds to the amount of volatile memory allocated to the corresponding process; and
    in response to a determination that a respective memory heap usage has reached the heap-size limit, increasing the heap-size limit.

11. The method of claim 10, further comprising:
    in response to increasing the heap-size limit, allocating additional volatile memory to the corresponding process, while the corresponding process is running, in accordance with the increased heap-size limit.

12. The method of claim 10, further comprising, after increasing the heap-size limit, allocating an amount of volatile memory corresponding to the increased heap-size limit to the corresponding process during a subsequent relaunch of the corresponding process.

13. The method of claim 10, wherein the plurality of processes is all processes from a predetermined list of processes.

14. The method of claim 10, wherein the plurality of processes is selected from the group consisting of:
    all processes having an active allocation of volatile memory at or above a third predetermined threshold level; and
    a predetermined number of processes having the largest active allocation of volatile memory.

15. The method of claim 10, wherein repeatedly determining the plurality of memory heap usages comprises periodically determining the plurality of memory heap usages.

16. The method of claim 1, further comprising:
    comparing a memory heap usage of a process with a highest memory heap usage to a global heap-size limit specifying a maximum memory heap usage for processes; and
    in response to a determination that the memory heap usage of the process with the highest memory heap usage is below the global heap-size limit by more than a specified margin, decreasing the global heap-size limit in accordance with the specified margin.

17. An electronic device, comprising:
one or more processors;
volatile memory; and
non-volatile memory, the non-volatile memory storing one or more programs configured to be executed by the one or more processors, the one or more programs comprising instructions for:
  repeatedly comparing an amount of free volatile memory to a first predetermined threshold level; and
  in response to a determination that the amount of free volatile memory does not satisfy the first predetermined threshold level, deallocating volatile memory, the deallocating comprising:
    identifying one or more processes having the lowest respective priorities of the processes in a set of processes eligible to be terminated; and
    terminating the identified one or more processes in reverse order of prioritization until the amount of free volatile memory rises above a second predetermined threshold level.

18. A non-transitory computer-readable storage medium storing one or more programs, the one or more programs comprising instructions, which when executed by an electronic device with one or more processors and volatile memory, cause the electronic device to:
  repeatedly compare the amount of free volatile memory to a first predetermined threshold level; and
  in response to a determination that the amount of free volatile memory does not satisfy the first predetermined threshold level, deallocating volatile memory, the deallocating comprising:
    identifying one or more processes having the lowest respective priorities of the processes in a set of processes eligible to be terminated; and
    terminating the identified one or more processes in reverse order of prioritization until the amount of free volatile memory rises above a second predetermined threshold level.

* * * * *